(12) United States Patent
Weber

(10) Patent No.: US 7,465,157 B2
(45) Date of Patent: Dec. 16, 2008

(54) COMPACT ECCENTRIC SCREW PUMP

(75) Inventor: Helmuth Weber, Simbach am Inn (DE)

(73) Assignee: Netzsch-Mohnopumpen GmbH (DE)

( * ) Notice: Subject to any disclaimer, the term of this patent is extended or adjusted under 35 U.S.C. 154(b) by 0 days.

(21) Appl. No.: 11/763,553

(22) Filed: Jun. 15, 2007

(65) Prior Publication Data

US 2007/0253852 A1 Nov. 1, 2007

Related U.S. Application Data

(63) Continuation of application No. PCT/DE2005/002303, filed on Dec. 14, 2005.

(30) Foreign Application Priority Data

Dec. 15, 2004 (DE) .................. 10 2004 060 222

(51) Int. Cl.
*F01C 1/10* (2006.01)
*F03C 2/00* (2006.01)
*F04C 2/00* (2006.01)

(52) U.S. Cl. .................. 418/48; 418/182; 403/300; 403/313; 403/331; 403/381

(58) Field of Classification Search .................. 418/48, 418/182; 403/300, 313, 331, 368, 381, 374.4
See application file for complete search history.

(56) References Cited

U.S. PATENT DOCUMENTS

| 2,545,604 | A | * | 3/1951 | Byram | 418/48 |
| 3,307,486 | A | * | 3/1967 | Lindberg | 418/48 |
| 3,600,113 | A | * | 8/1971 | Pahl et al. | 418/48 |
| 4,907,906 | A | * | 3/1990 | Hantschk | 418/48 |
| 6,358,027 | B1 | | 3/2002 | Lane | |
| 2002/0192093 | A1 | | 12/2002 | Gantenhammer | |

FOREIGN PATENT DOCUMENTS

| DE | 20 57 860 | | 6/1972 | | |
| DE | 2738945 | A | * | 3/1979 | 418/48 |
| DE | 05087059 | A | * | 4/1993 | 418/48 |

OTHER PUBLICATIONS

Search Report, Mar. 20, 2006, 4 pages.

* cited by examiner

*Primary Examiner*—Theresa Trieu
(74) *Attorney, Agent, or Firm*—St. Onge Steward Johnston & Reens LLC

(57) ABSTRACT

The invention relates to a compact eccentric screw pump including a sliding articulation. The long-lasting operation of the pump is ensured by a plurality of functions. According to the invention, both the reaction pressure resulting from the transport pressure and the concomitant phenomena emerging from the eccentrically rotating rotor and acting on the articulation and the drive are approximately equalized.

21 Claims, 6 Drawing Sheets

COMPACT ECCENTRIC SCREW PUMP

CROSS-REFERENCE TO RELATED APPLICATIONS

The present application is a continuation of pending International patent application PCT/DE2005/002303 filed on Dec. 14, 2005 which designates the United States and claims priority from German patent application 10 2004 060 222.0 filed on Dec. 15, 2004, the content of which is incorporated herein by reference.

FIELD OF THE INVENTION

The invention relates to an eccentric screw pump with a stator with screw-shaped cavity and a screw-shaped rotor eccentrically arranged in said cavity, whose rotor head is connected with a joint, wherein a seal is seated between the rotor and the joint which follows the eccentric rotor movement.

BACKGROUND OF THE INVENTION

An eccentric screw pump is known from DE 0S 20 57 860. With this pump a guide disc is seated on the drive shaft. On both of its radial faces this disc is guided on fixed surfaces.

An abutment ring having a sealing ring is seated in the direction to the drive. This sealing ring abuts the disc and is subjected to pressure by a spring.

The object of the invention is to shorten the length of an eccentric screw pump, avoid impairment of the articulation and the bearings in compact pumps and to reduce the drive power without impairing the delivery rate of said pump.

SUMMARY OF THE INVENTION

This object is solved with the characteristics of claims 1.

Advantageous further developments according to the invention are evident from the characteristics of the subclaims.

An exemplary embodiment of the invention more preferably relates to a compact pump. Compact pump because a very short design is achieved with this pump through the use of a so-called sliding joint. The length of the pump housing in this case only amounts to a small part of the total pump length if the otherwise usual lengths when using cardan shafts or electric flexural member connections are compared.

The invention is based on that the optimum design of the invention is embodied in that the stator region and the joint region are spatially separated from each other through a seal, wherein the rotor head or a rotor extension has at least a diameter reduction in the region between the support ring, which is part of the slide ring seal and the rotor. Through this one or several diameter reductions, deflections created by the rotor are already reduced in the region of the rotor before the seal, as a result of which a more even contact of the slide ring/s on the sealing disc is made possible.

Depending on the products and delivery rates for which the pump is designed and which materials are employed the diameter and the diameter reductions can be selected differently. Thus the diameter reductions can have a value of 30% to 80% of the value of the diameter of the rotor. As a function of the rotor diameter the diameter reduction can also amount to 30% to 60% more preferably 50%.

With special (wear-resistant) materials it can be advantageous if not only one diameter reduction but several with different reduction values are provided. Here, the axial distances of the diameter reductions range between the two to tenfold value of the respective diameter reduction. Thus, if the diameter is reduced to 10 mm the next reduction can be arranged at a distance of 20 mm to 100 mm from the first. In special cases the ratio amounts to two to six times the value of the respective diameter reduction.

To improve the operation of the slide ring seal and its sealing through the bellows the region of the rotor head or the rotor extension on which the bellows or the spring is fastened, can assume a greater value compared with the rotor diameter. The corresponding rotor head or the rotor extension part in this case has 1.2 to 2× the value of the rotor diameter.

In special application cases of the pump according to the invention a double-sided slide ring seal will be employed to prevent entry of product in the bearing region and entry of lubricant in the pump space.

With the eccentric screw pump according to the invention the seal is arranged between the pump inlet housing and the pump lantern in which the joint is seated. Under certain preconditions it is advantageous if the width of the constrictions or diameter reductions in the region of the rotor is at least 20% greater than in the region of the sealing disc.

According to a development of the invention a slide ring each is arranged on both sides of a sealing disc. The sealing disc has at least a radial bore which is connected to the sealing fluid space.

According to the invention, the rotor extension extends over both regions on the other side of the sealing disc. In this case the diameter of the rotor extension has different sizes in both regions.

The largest diameter of the rotor extension in both regions corresponds to 1.2 to 3 times the smallest diameter of the rotor extension. On both of its sides the sealing disc is provided with sliding surfaces.

The slide rings arranged on these sliding surfaces are connected with springs which are supported on the clamping pieces.

According to the invention, bellows are arranged between the springs and the pump shaft which seal off the sealing fluid space.

The bellows are further developed in that one side of the bellows is connected with a clamping piece each fastened to the rotor head or rotor head extension.

The sealing disc is arranged between the pump inlet housing and the pump lantern in which a sliding joint is situated.

The sliding joint is fastened to the end of the rotor extension.

In a version of the invention the sliding joint is connected with the drive shaft and consists of two linear units which are arranged 90° offset to each other, wherein each linear unit consists of a profile rail and a carriage each.

DETAILED DESCRIPTION OF THE INVENTION

Figure 1:
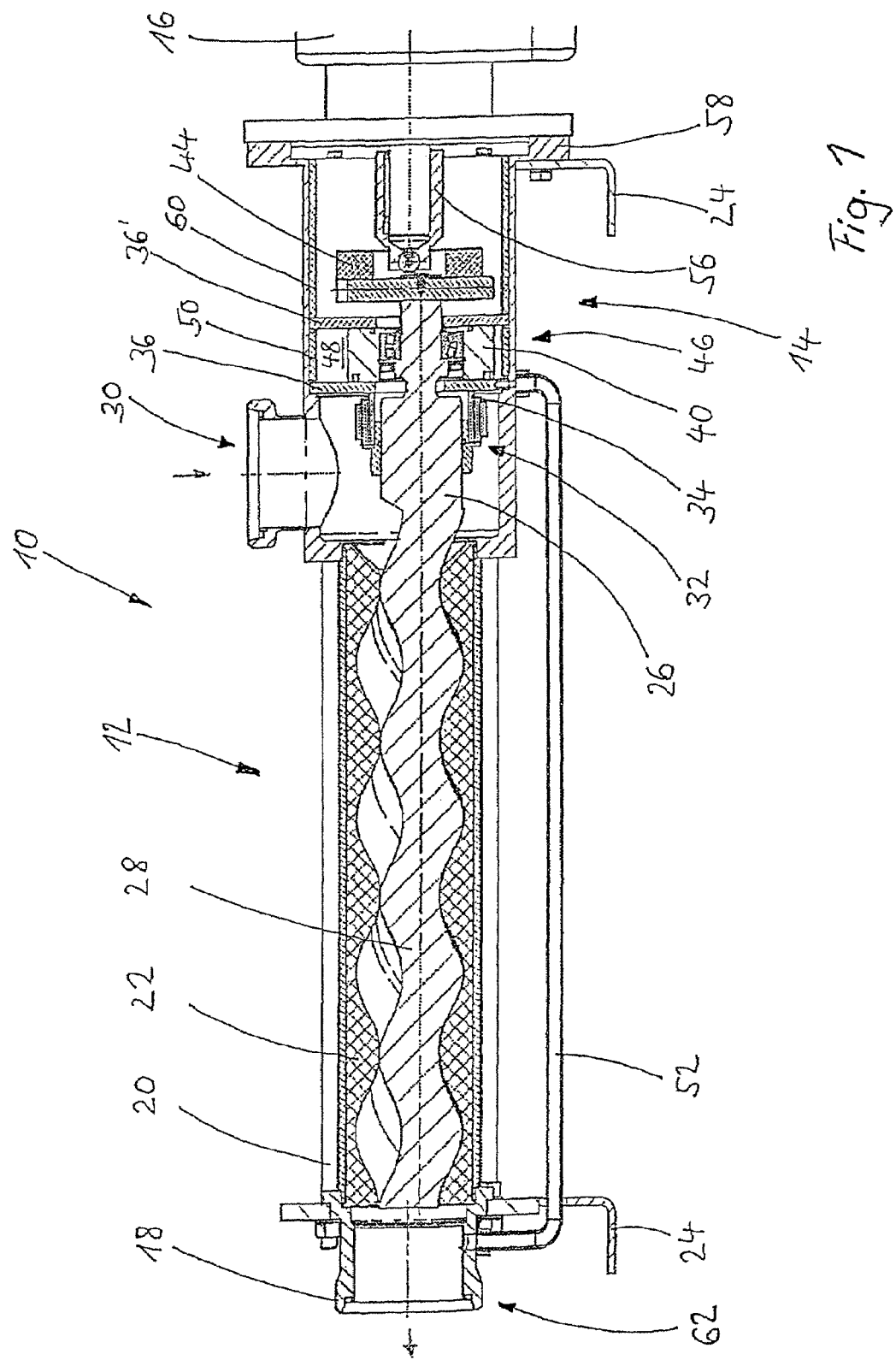
FIG. 1 longitudinal section of an eccentric screw pump.

FIG. 1 shows an eccentric screw pump 10 having a rotor/stator region 12, a pump housing 14 and a drive 16. At the left end of the eccentric screw pump shown a flange 18 is seated which is clamped to the pump housing 14 via tension rods 20 and thus also firmly connects the stator 22 arranged in-between with the pump housing. The eccentric screw pump stands on the two feet 24 which are connected to the flange and the housing. The cross section of the rotor head 26 or the extension of the rotor 28 is reinforced in the region of the inlet 30. In this region a slide ring seal 32 with a slide ring 34 is seated on the rotor, which slide ring is in contact with the left of the two support discs 36, 36'. A seal, in this case a slide ring seal 32 or the slide ring 34 follows the eccentric rotational movement of the rotor 28. To offset an angular displacement and a possible axial play of the rotor 28 the slide ring 34 is provided with an elastic bellows 38.

Between the two support discs 36, 36' a centre disc 40 moves in radial direction corresponding to the eccentricity with which the rotor head 26 rotates. To this end, the centre disc 40 sits on a self-aligning roller bearing 42 and thus does not rotate itself but can merely move in axial direction via the spring washers which joins the centre disc, the bearing and the rotor with one another. Although axial rotor displacement is possible, this is prevented by a device 46. This device consists of several components of which the centre disc 40 assumes an essential role. The width of the centre disc 40 and the width of the pressure medium space 48 are not the same. The width of the pressure medium space 48 is determined by the length of the spacer tube 50 and is deliberately selected so large that between the right support disc 36' and the front end of the centre disc a gap develops in which hydraulic pressure becomes active. The pressure that operates in the pressure medium space and thus between centre disc 40 and support disc 36' depends on the pressure value that is present in the interior of the flange 18 on the pressure side. The value of this pressure is dependent on the back pressure created by the delivery pressure. A diaphragm in the flange 18 picks up this value and transfers it to a fluid in the pipeline 52 which is connected with the fluid in the pressure medium space 48. Thus, identical pressure conditions exist in the region of the flange 18 at the front end of the free end of the rotor and in the region of the centre disc, i.e. at the joint end of the rotor.

The equalization of the pressure conditions or an increase of the pressure between the centre disc 40 and the support disc 36' unloads the sliding joint 44 so that it is operated free of pressure. The hydraulic connection between the flange 18 on the pressure side and the pressure medium space 48 is a pipeline 52 which is connected with the pump housing 14 in the region of the support disc 36. The hydraulic connection between the interior of the pipeline 52 and the pressure medium space exists both via a radial and also an axial bore in the support disc 36.

The bearing and the joint region are connected with each other via a bore in the support disc 36'. The end of the rotor head 26 directly connected with the sliding joint 44 extends through this bore. The second part of the sliding joint is fastened to the drive shaft 54 via a feather key in a rotationally fixed but axially displaceable manner via the sleeve 56. Just as the distance between the support disc 36, 36' is predetermined by the spacer tube 50, the distance between the support disc 36 and the housing flange 58 is predetermined by a spacer tube 60.

Figure 2:
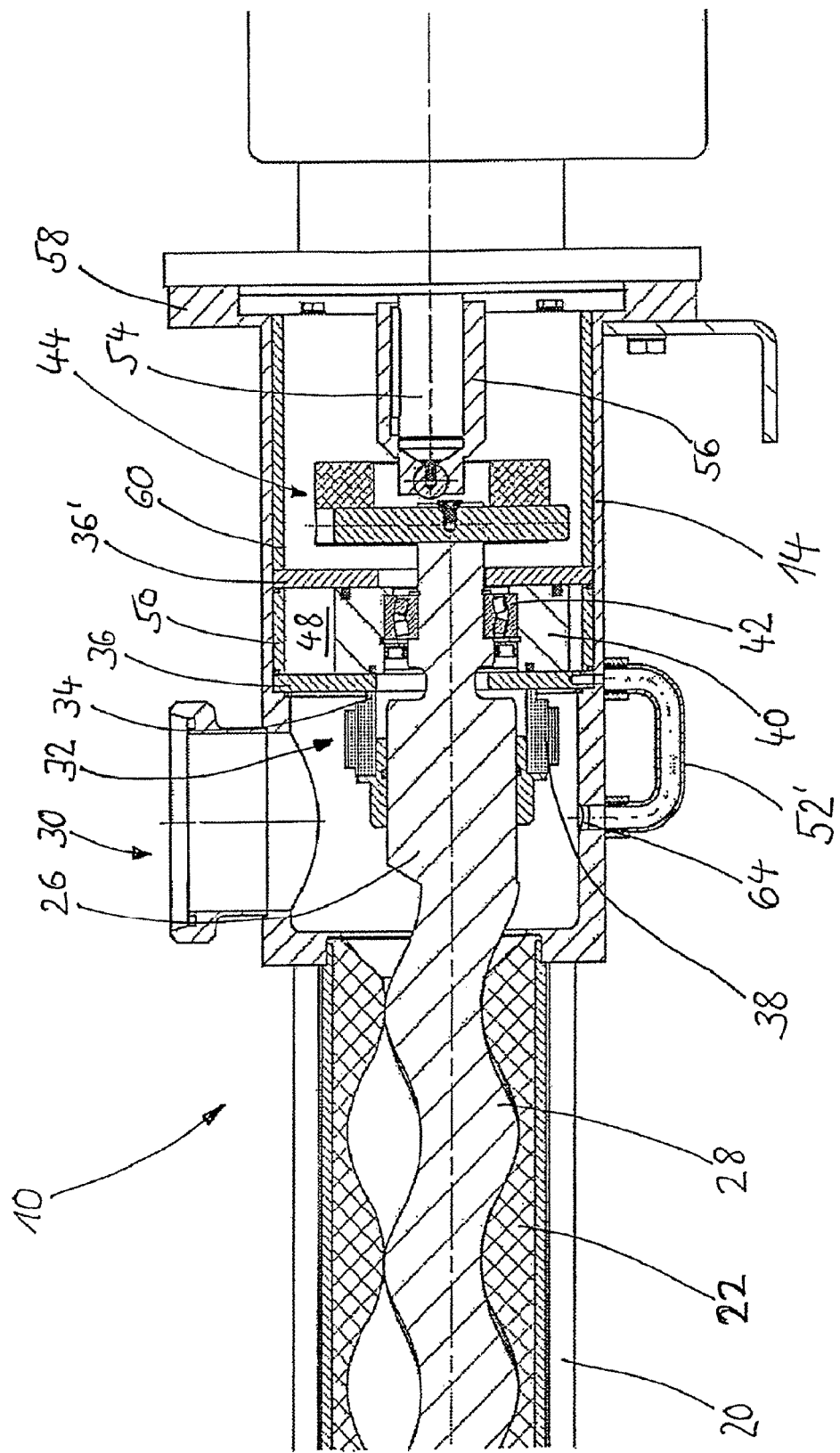
FIG. 2 part view of an eccentric screw pump.

FIG. 2 shows an exemplary embodiment of the invention in which the rotor is driven in clockwise direction. Here, the back pressure acting on the rotor, which could lead to increased loading of the sliding joint 44, does not develop at the free end of the rotor 28 but in the pump housing in the region of the slide ring seal or the pump outlet. Consequently hydraulic pressure equalization occurs between the part region of the pump housing and the pressure medium space (48). To this end, only a short U-shaped pipeline 52' is required. This short hydraulic connection, like the connection leading to the free pump end as well, can be established directly in the pump housing wall or the stator via a longitudinal bore to the pressure medium space. The pressure of the product acting on a diaphragm 64 is transmitted via the fluid in the pipeline to the fluid located in the pressure medium space 48. In contrast with anti-clockwise operation, a narrow gap is formed in this exemplary embodiment between the front end of the centre disc 40 and the support disc 36 so that the rotor is loaded with pressure in the direction towards the sliding joint. The gap length and thus the size of the front end of the centre disc which creates the back pressure here depends on the radial distance of the seals to the longitudinal axis of the rotor 28. The shorter the distance to the axis of the rotor the greater the effective pressure surface. To prevent that a pressure medium gap is also formed on the other side of the centre disc, the seal itself is selected larger in this case and is arranged with a greater distance from the rotor axis near the outer circumference of the centre disc. In total the surface on which the pressure medium acts on the centre disc must be equal or greater than the total of the surfaces on which the delivery back pressure acts on the rotor.

Figure 3:
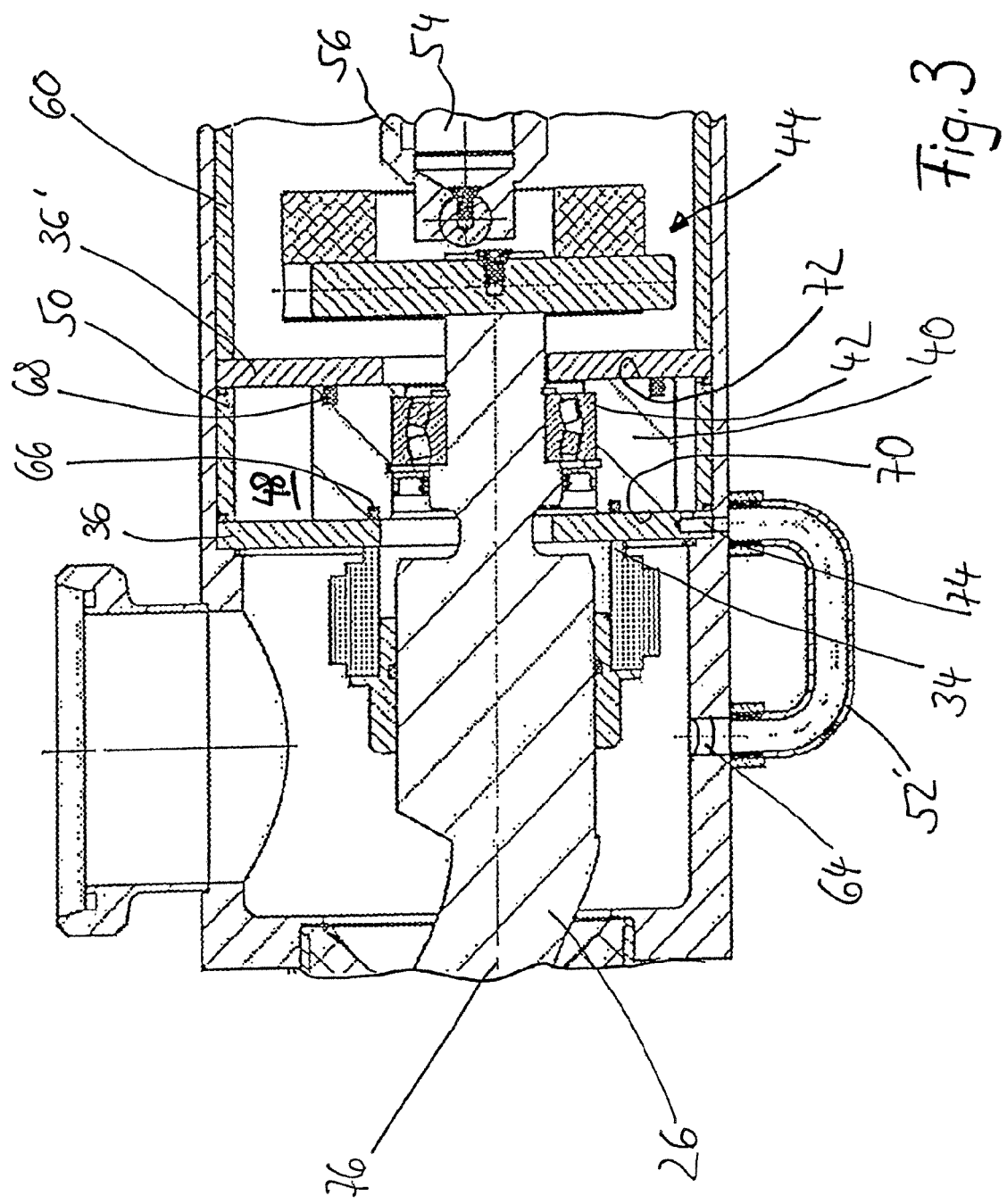
FIG. 3 part view of an eccentric screw pump.

The construction of the device 46 is explained with the embodiment shown in FIG. 3. Here the centre disc 40 is in the lowermost position. Even the arrangement of the differently dimensioned seals 66, 68 alone shows the side of the centre disc on which a gap is formed through the pressure medium. Here, the gap develops between the support disc 36 and the centre disc 40. The size of the ultimately acting pressure surface 70 is determined by the distance of the seal 66 to the longitudinal axis 76 of the rotor 28 or rotor head 26. The pressure medium in the pipeline 52' thus exerts pressure on the pressure surface 70, 72 via the bore 74 and the pressure medium space 48 and thus equalizes the pressure differential that develops during the pumping process which would otherwise result in an axial displacement or loading of the pump parts connected with the rotor. The pressure surfaces 70, 72 of the centre disc 40 and/or the complementary surfaces of the support discs 36, 36' themselves are made of wear-resistant material or coated with such.

Figure 4:
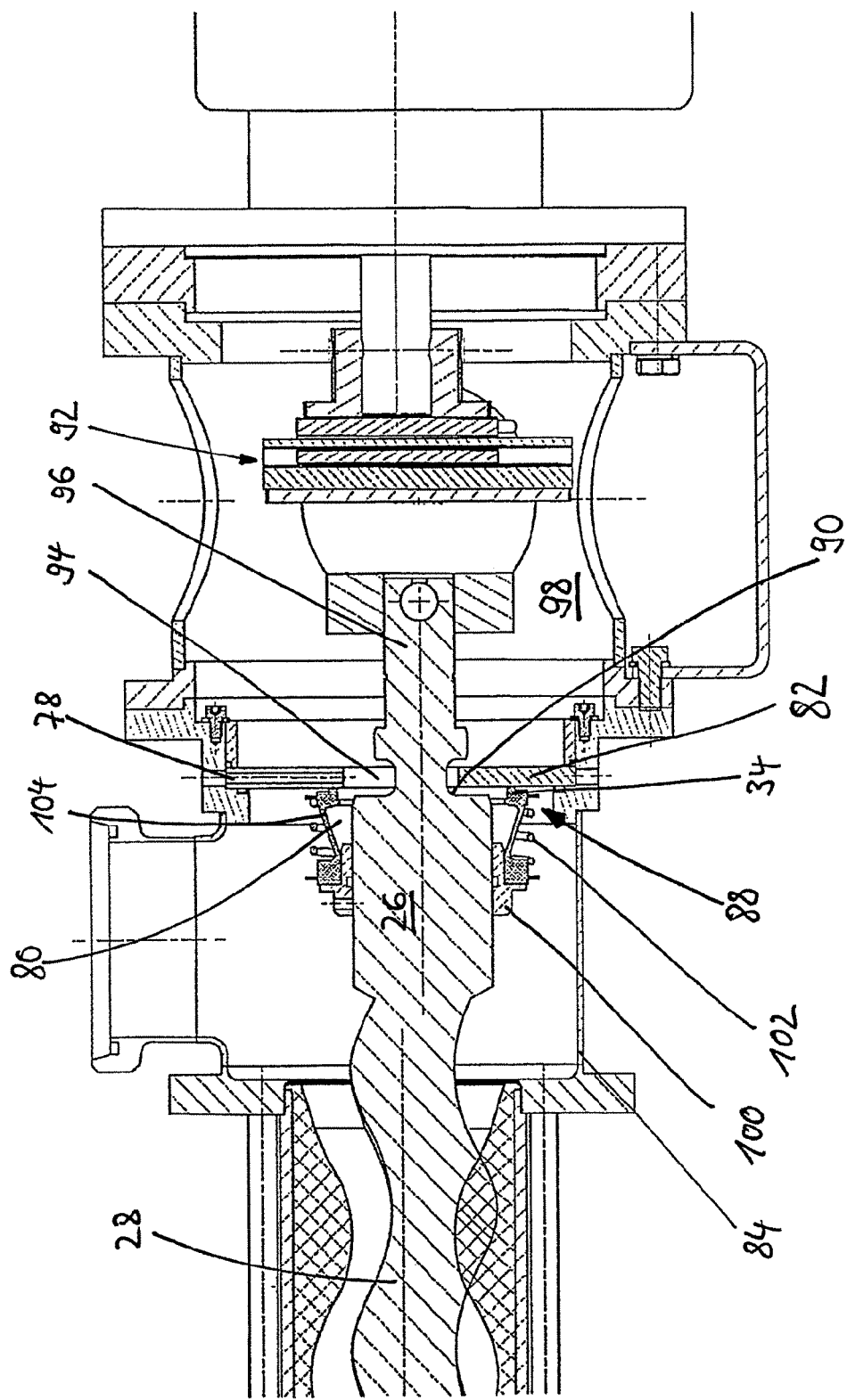
FIG. 4 part view of an eccentric screw pump.

The exemplary embodiment according to FIG. 4 shows a contact pump with a joint, in this special design a sliding joint 92. Although the sliding joint 92 over a very short distance is able to convert the eccentric rotational movement caused by the rotor into a concentric one, damping of the oscillating rotational movement through a diameter reduction 90 is already brought about in the region of the slide ring seal 88. This first diameter reduction 90 provides the rotor extension with a higher elasticity characteristic and thus transmits a lesser angular load to the joint 92. The sealing to be introduced via the radial bore 78 of the sealing disc 82 fills the region of the slide ring seal just as the space 98 in which the sliding joint 92 is arranged. The rotor extension, consisting of the rotor head 26 and the shoulder 96, extends through the central bore 94 located in the slide ring. The shoulder 96 at its right end is connected with a part of the sliding joint 92 from which the drive force is transmitted to the rotor 28. In the region of the central bore 94 the rotor head 26 follows the diameter reduction which presents itself as constriction or as a notch. A clamping piece 100, on which both the spring 102 and also a bellows 104 are held is seated on the rotor head. The bellows 104, which radially is arranged closer to the pump longitudinal axis than the spring 102 jointly seals the sealing space 80 towards the pump inlet housing 84 with the slide ring 34.

Figure 5:
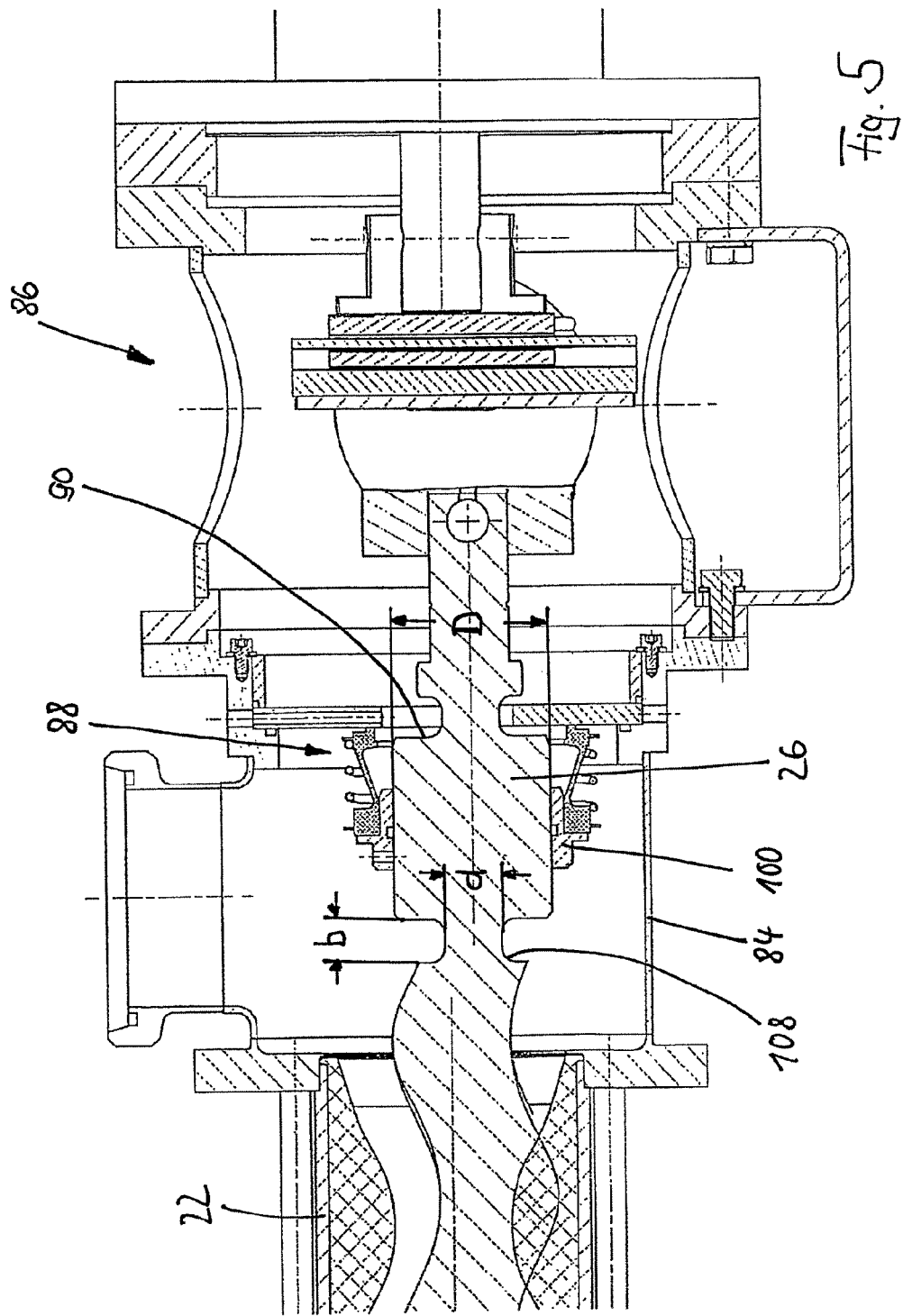
FIG. 5 part view of an eccentric screw pump.

FIG. 5 shows an eccentric screw pump which largely corresponds to the exemplary embodiment of FIG. 4. The essential difference between this exemplary embodiment FIG. 5 consists in that the rotor 28 is directly followed by a second diameter reduction 108. Both diameter reductions 90, 108 can have the same width b and the same diameter d. The distance A of the diameter reductions 90, 108 in this case corresponds to 3.2× the value of the diameter reduction or the cross section of the corresponding rotor head and rotor extension sections. Depending on which material was selected or is required, the width b of the second diameter reduction 108 can be greater than the width of the diameter reduction 90. The diameter d of the diameter reductions 90, 108 can be just as different. To avoid unnecessary wear the diameter reductions are made in the form of round notches. To improve the sealing function the bellows 104 and the spring 102 are fastened between the diameter reductions on a part of the rotor head 26 whose diameter D corresponds to 0.5 to 2× the rotor diameter.

If a liquid operating medium other than the sealing is to be employed in the so-called pump lantern in which the sliding joint 92 with its two linear units is arranged, a double-sided slide ring seal will be employed in this case.

Figure 6:
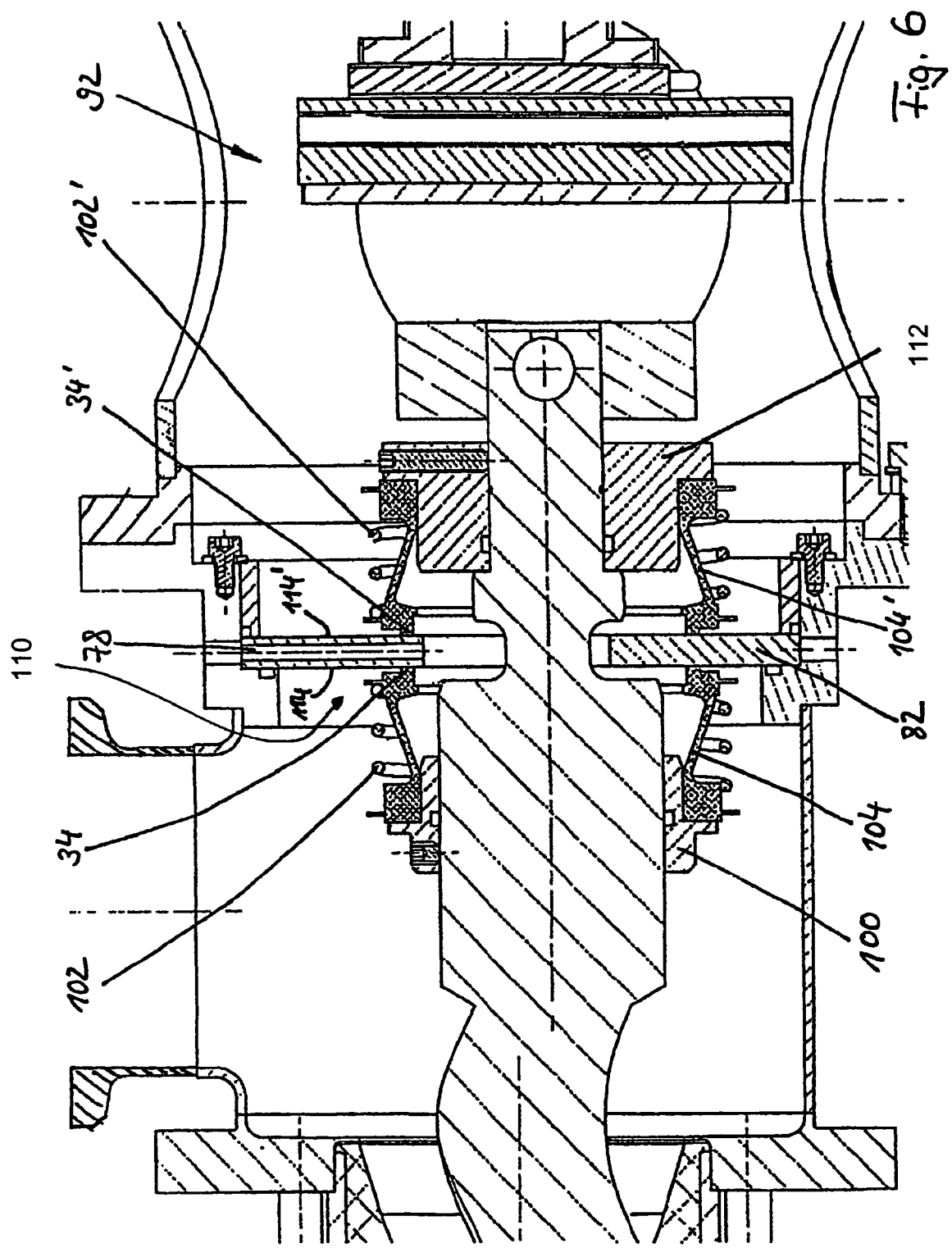
FIG. 6 part view of an eccentric screw pump.

In FIG. 6 a seal 110 is shown where on both sides of the sealing disc 82, slide rings 34, 34' are in contact with the sliding surfaces 114, 114'. The slide ring 34' contacts the right sealing surface of the sealing disc 82 under the pressure of the spring 102'. The diameter jump between the rotor head 26 and the shoulder 96 with regard to the fixing and bearing adaptation of the slide ring 34' is offset through the clamping piece 112 which is strengthened in diameter. Both clamping pieces are clamped to the rotor by means of screws. The sliding joint has two linear units offset by 90° consisting of profile rails and associated carriages.

What is claimed is:

1. An eccentric screw pump with a stator with a screw-shaped cavity and a screw-shaped rotor eccentrically arranged in said cavity, whose rotor head is connected with a sliding joint, wherein between the rotor and sliding joint a seal is seated which follows the eccentric rotor movement, characterized in that the seal consists of at least a slide ring and a sealing disc and a rotor head or a rotor extension in the region between the rotor and the sealing disc has at least one diameter reduction.

2. The eccentric screw pump according to claim 1, characterized in that the diameter of the rotor head or the rotor extension in the region of the diameter reduction amounts to between 30% and 80% of the diameter of the rotor.

3. The eccentric screw pump according to claim 1, characterized in that the diameter reduction amounts to between 30% and 60% of the diameter of the rotor.

4. The eccentric screw pump according to claim 3, characterized in that the diameter reduction amounts to 50% of the diameter of the rotor.

5. The eccentric screw pump according to claim 1, characterized in that the diameter reduction/s of the rotor extension has/have the same or different value/s.

6. The eccentric screw pump according to claim 5, characterized in that the distance of the diameter reductions corresponds to two to ten times the value of the respective diameter reductions.

7. The eccentric screw pump according to claim 6, characterized in that the distance of the diameter reductions corresponds to two to six times the value of the respective diameter reductions.

8. The eccentric screw pump according to claim 7, characterized in that the distance of the diameter reductions corresponds to two to four times the value of the respective diameter reductions.

9. The eccentric screw pump according to claim 1, characterized in that the diameter of the rotor extension between at least two diameter reductions corresponds to 1.2 to 3 times the rotor diameter.

10. The eccentric screw pump according to claim 1, characterized in that the diameter of the rotor head or the rotor extension corresponds to 1.2 to 2 times the rotor diameter.

11. The eccentric screw pump according to claim 1, characterized in that with the same values of the diameter reductions the width b of the constriction on the rotor is at least 20% greater than the width of the constriction in the region of the sealing disc.

12. The eccentric screw pump according to claim 1, characterized in that the slide ring is arranged on both sides of the sealing disc and the sealing disc has at least one radial bore which terminates in the sealing space.

13. The eccentric screw pump according to claim 12, characterized in that the sliding rings are connected with springs which are supported on clamping pieces.

14. The eccentric screw pump according to claim 13, characterized in that between the springs and the pump axis, bellows are arranged.

15. The eccentric screw pump according to claim 14, characterized in that one side of the bellows each is connected with a clamping piece fastened to the rotor head/extension.

16. The eccentric screw pump according to claim 1, characterized in that the diameter of the rotor extension in both regions on the other side of the sealing disc has different sizes.

17. The eccentric screw pump according to claim 16, characterized in that the greatest diameter of the rotor extension of the two regions corresponds to 1.2 to 3 times the smallest diameter of the rotor.

18. The eccentric screw pump according to claim 1, characterized in that a sealing disc with two sliding surfaces is provided.

19. The eccentric screw pump according to claim 18, characterized in that the sealing disc is arranged between the pump inlet housing and the pump lantern in which the sliding joint is located.

20. The eccentric screw pump according to claim 19, characterized in that the sliding joint is connected with a drive shaft, wherein the sliding joint consists of two linear units which are arranged at 90° relative to each other and each of the linear units consists of a profile rail and a carriage.

21. The eccentric screw pump according to claim 1, characterized in that the sliding joint is firmly attached at the end of the rotor extension.

* * * * *